Patented June 8, 1943

2,321,278

UNITED STATES PATENT OFFICE 2,321,278

PREPARATION OF CHLOROACETAMIDE

Edgar C. Britton and William R. Shawver, Midland, Mich., assignors to The Dow Chemical Company, Midland, Mich., a corporation of Michigan No Drawing. Application November 6, 1941, Serial No. 418,047

8 Claims. (Cl. 260—561)

This invention relates to the preparation of alpha-chloroacetamide and more particularly to its preparation from ammonia and an ester of alpha-chloroacetic acid.

Several methods for the preparation of acyl amides have been described in the literature. These methods include the heating of the ammonium salt of the corresponding acid, the reaction between the corresponding acyl halide and ammonia and the reaction between an ester of the corresponding acid and aqueous ammonia. In each of these known methods certain other products, in addition to the acyl amide, are formed in the reaction, e. g. ammonium chloride, water, alcohol, etc., which are usually removed from the product by crystallization, distillation or in other usual ways. In the preparation of mono-chloroacetamide by any of these previously known methods considerable difficulty is experienced due to the fact that the chlorine substituent is very reactive and tends to react with one or more of the products in the reaction mixture to form undesirable by-products such as ammonium chloride, amino acetic acid, and the like. As a result the chloroacetamide product is contaminated, e. g. with ammonium chloride, and extra steps for its purification are necessitated if a pure product is to be obtained. For example, the reaction between methyl- or ethyl-chloroacetate and aqueous ammonia leads to the formation of crystalline chloroacetamide containing 0.5 per cent or more of ammonium chloride. The recrystallization steps required for removal of the latter are inconvenient and seldom permit complete recovery of the chloroacetamide in purified form. Furthermore, the use of aqueous ammonia as a reactant introduces considerable water into the reaction mixture and since chloroacetamine is soluble in water, means must be employed for recovering the amide from the aqueous solution.

We have found that mono-chloroacetamide may be prepared readily, in high yield and with the formation of negligible amounts of by-products by reacting an ester of mono-chloroacetic acid with anhydrous ammonia.

The reaction is advantageously carried out at a temperature between $-20°$ and $30°$ C. and preferably between $-10°$ and $20°$ C. The ammonia is passed, usually in gaseous form, into the liquid ester of mono-chloroacetic acid, while cooling and stirring the latter. The reaction proceeds rapidly and the ammonia is added at such a rate that the temperature does not rise above the desired range. Although the methyl or ethyl ester of chloroacetic acid is preferably employed in the reaction, esters prepared from other lower boiling alcohols, i. e. from alkanols containing less than six carbon atoms in the molecule, may be used if desired. It should be mentioned that the use of esters prepared from such lower boiling alcohols permits convenient removal by vaporization of the alcohol which is formed along with the chloroacetamide. Approximately one mol of substantially anhydrous ammonia, i. e. ammonia containing not more than 5.0 per cent by weight of moisture, is used for each mol of ester. After the ammonia has been added, stirring is continued for a short time, e. g. from 30 minutes to 1 hour, to allow the reaction to reach the desired degree of completion and the reaction mixture is then filtered. The crystals of chloroacetamide may be washed with a little alcohol or water and dried. The filtrate, which consists of the alcohol formed during the reaction together with minor quantities of chloroacetamide dissolved therein, may be concentrated, if desired, and a further quantity of chloroacetamide be crystallized therefrom.

Certain of the advantages of the invention will be seen from the following example, which is illustrative and is not to be construed as limiting the invention:

*Example*

217 grams (2 mol) of methyl mono-chloroacetate was placed in a flask fitted with an agitator, gas inlet tube, and means for cooling. With the agitator running, 35.5 grams (2.1 mol) of anhydrous gaseous ammonia was led in beneath the surface of the ester over a period of four hours while keeping the temperature of the reaction mixture at from $2°$ to $6°$ C., after which the mixture was stirred for an additional one hour at the same temperature. During these operations, chloroacetamide was formed and crystallized from the mixture. The crystalline product was removed by filtration and dried without washing. There was thus obtained 156 grams or a yield of 83 per cent of theoretical of pure mono-chloroacetamide melting at $119°$ C. The product contained 0.06 per cent of inorganic chlorine, calculated as ammonium chloride. The filtrate was concentrated by evaporation and a second crop of crystals obtained which weighed 8.0 grams and had a melting point of $119°$ C. The total yield of pure product was thus 164 grams or 87.6 per cent of theoretical.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:

1. The method which comprises reacting a lower alkyl ester of mono-chloroacetic acid with anhydrous ammonia to produce mono-chloroacetamide.

2. The method which comprises reacting a lower alkyl ester of mono-chloroacetic acid with anhydrous ammonia at a temperature between −20° and 30° C. to produce mono-chloroacetamide.

3. The method which comprises reacting a lower alkyl ester of mono-chloroacetic acid with anhydrous ammonia at a temperature between −10° and 20° C. to produce mono-chloroacetamide.

4. The method which comprises reacting a lower alkyl ester of mono-chloroacetic acid with anhydrous ammonia in approximately equimolecular proportions and at a temperature between −10° and 20° C. to produce mono-chloroacetamide.

5. The method which comprises reacting ethyl mono-chloroacetate with anhydrous ammonia to produce mono-chloroacetamide.

6. The method which comprises reacting ethyl mono-chloroacetate with approximately one molecular proportion of anhydrous ammonia at a temperature between −10° and 20° C. to produce mono-chloroacetamide.

7. In a method wherein a lower alkyl ester of mono-chloroacetic acid is reacted with anhydrous ammonia to produce mono-chloroacetamide, the step which consists in mixing the ester of mono-chloroacetic acid and the ammonia in approximately equimolecular proportions and at a temperature between −10° and 20° C.

8. In a method wherein a lower alkyl ester of mono-chloroacetic acid is reacted with anhydrous ammonia to produce mono-chloroacetamide, the steps which consist in mixing the ester of mono-chloroacetic acid and the ammonia in approximately equimolecular proportions and at a temperature between −10° and 20° C., and separating mono-chloroacetamide from the reacted mixture.

EDGAR C. BRITTON.
WILLIAM R. SHAWVER.